P. HAAS.
ADJUSTABLE COLTER.
APPLICATION FILED DEC. 18, 1913.
1,094,068.
Patented Apr. 21, 1914.
Fig. I.
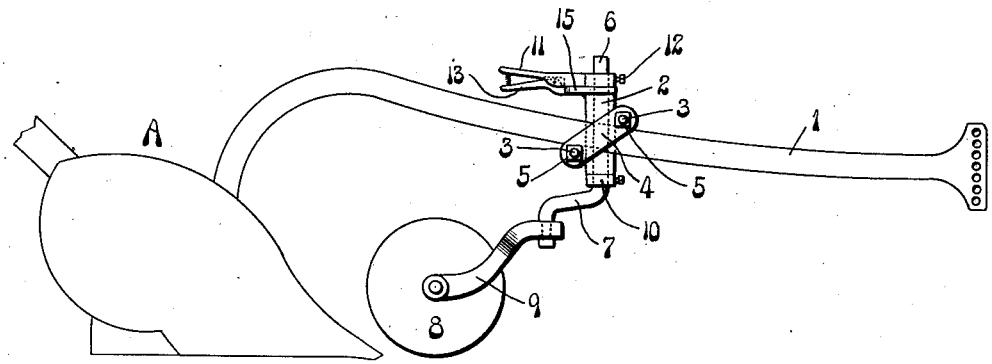
Fig. II.
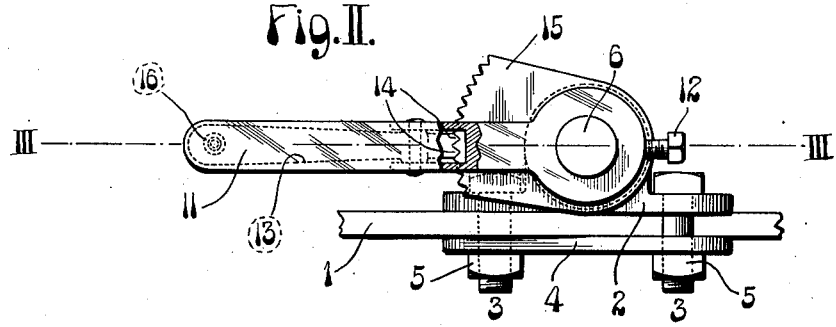
Fig. III.
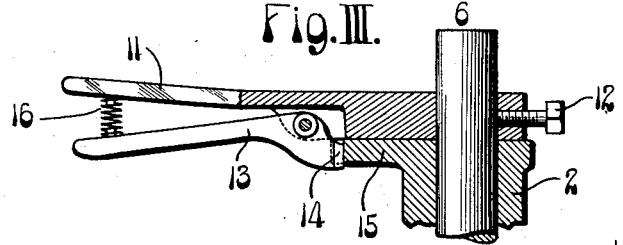
Attest
a.J. McCauley
E. B. Pierce
Inventor:
Peter Haas
by Knight + Cook
Attys.

UNITED STATES PATENT OFFICE.

PETER HAAS, OF NEW ATHENS, ILLINOIS, ASSIGNOR OF ONE-HALF TO WILLIAM H. SLEIGHT, OF ST. LOUIS, MISSOURI.

ADJUSTABLE COLTER.

1,094,068.   Specification of Letters Patent.   Patented Apr. 21, 1914.

Application filed December 18, 1913.   Serial No. 807,434.

*To all whom it may concern:*

Be it known that I, PETER HAAS, a citizen of the United States of America, and a resident of New Athens, in the county of St. Clair and State of Illinois, have invented certain new and useful Improvements in Adjustable Colters, of which the following is a full, clear, and exact description, reference being had to the accompanying drawings, forming a part of this specification.

My invention relates to an adjustable colter, and has for its object the production of a colter that may be easily adjusted either in a vertical or horizontal direction, and readily locked in position after such adjustment.

The preferred form of the invention is in the nature of an attachment adapted to be applied to a plow beam or other suitable carrier, and a most important feature of the invention lies in an adjustable locking device operable to adjust the colter in a horizontal direction and preferably so constructed as to be locked automatically when released by the operator.

Figure I is a side elevation of a plow equipped with my adjustable colter. Fig. II is an enlarged top or plan view illustrating the adjustable locking device. Fig. III is a section taken approximately on the line III—III, Fig. II.

In the accompanying drawings: A designates a plow, having a beam 1 and 2 is a bearing secured to the plow beam by bolts 3 passing through flanges on the bearing and also passing through an inclined bar 4. The plow beam is located between the bearing 2 and bar 4 so that the nuts 5 may be tightened to firmly secure the bearing to the plow beam.

6 designates a stem rotatably fitted to the bearing 2 and provided with a crank arm 7 at its lower end.

The colter comprises a wheel 8 rotatably mounted in a fork 9, the latter being pivotally connected to the crank arm 7.

10 designates a set collar adjustably fitted to the stem 6 below the bearing 2, and 11 is a latch handle adjustably secured to the stem 6 above the bearing 2, by means of a set screw 12. The latch handle 11 and set collar 10 may be adjusted on the stem 6 to permit a vertical adjustment of the colter.

The colter may be adjusted horizontally by turning the latch handle 11, thereby turning the stem 6 and crank 7 so as to shift the colter fork 9.

The means for locking the adjustable latch handle 11, comprises a latch dog 13 pivoted to the latch handle and provided with teeth 14 adapted to interlock with a toothed sector 15 the latter being fixed to the upper end of the bearing 2.

16 designates a spring arranged between the latch handle and the latch dog 13. The latch handle 11 and latch dog 13 may be readily grasped by the operator to unlock the stem 6 from the bearing 2, the handle serving as means for turning the stem, and when the stem is adjusted to the desired position the handle is released and the spring 16 then forces the latch dog 13 into engagement with the toothed sector 15.

I claim:—

1. A device of the character described comprising a carrier, a bearing secured to said carrier, a stem rotatably fitted to said bearing and provided with a crank arm, a fork pivotally connected to said crank arm, a colter wheel carried by said fork, a set collar adjustably fitted to said stem, a latch handle adjustably secured to said stem, a toothed sector fixed to said bearing, a latch dog pivoted to said latch handle and adapted to interlock with the teeth on said sector, and a spring tending to force said latch dog into engagement with said teeth.

2. A device of the character described comprising a carrier, a bearing secured to said carrier, a stem rotatably fitted to said bearing and provided with a crank arm, a fork pivotally connected to said crank arm, a colter wheel carried by said fork, a set collar adjustably fitted to said stem below said bearing, a latch handle adjustably secured to said stem above said bearing, a toothed sector fixed to said bearing below said latch handle, a latch dog pivoted to said latch handle and adapted to interlock with the teeth on said sector, and a spring tending to force said latch dog into engagement with said teeth.

PETER HAAS.

In the presence of—
E. B. LINN,
E. K. CLARK.

---

Copies of this patent may be obtained for five cents each, by addressing the "Commissioner of Patents, Washington, D. C."